(12) United States Patent
Poysa et al.

(10) Patent No.: US 8,953,190 B2
(45) Date of Patent: Feb. 10, 2015

(54) AUTOMATED METHOD AND SYSTEM FOR HOLDING AND AUTHENTICATING A DEVICE CONFIGURATION CHANGE PAYLOAD JOB

(75) Inventors: Kari Kalevi Poysa, Macedon, NY (US); Jason Slack, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 393 days.

(21) Appl. No.: 13/157,094

(22) Filed: Jun. 9, 2011

(65) Prior Publication Data

US 2012/0314238 A1     Dec. 13, 2012

(51) Int. Cl.
*G06K 15/02* (2006.01)
*G06F 9/445* (2006.01)
*G06K 15/00* (2006.01)
*G06F 21/60* (2013.01)

(52) U.S. Cl.
CPC .............. *G06F 8/65* (2013.01); *G06K 15/1805* (2013.01); *G06K 15/002* (2013.01); *G06F 21/608* (2013.01)
USPC ........................................ 358/1.14; 358/1.15

(58) Field of Classification Search
CPC . G06K 15/02; G06K 15/002; G06K 15/1805; G06F 21/00; G06F 21/10; G06F 21/12; G06F 21/121; G06F 21/30; G06F 21/31; G06F 21/608; G06F 9/445; G06F 9/44505
USPC ......... 358/1.1, 1.14, 1.15, 400, 401, 442, 468
See application file for complete search history.

(56) References Cited

U.S. PATENT DOCUMENTS

| | | | |
|---|---|---|---|
| 5,818,206 A | 10/1998 | Titus et al. | 323/285 |
| 5,920,405 A | 7/1999 | McIntyre et al. | 358/442 |
| 6,814,510 B1 | 11/2004 | Sabbagh et al. | 400/63 |
| 7,023,566 B2 * | 4/2006 | Yegnanarayanan | 358/1.1 |
| 7,145,682 B2 * | 12/2006 | Boldon | 358/1.15 |
| 7,190,467 B2 * | 3/2007 | Simpson et al. | 358/1.1 |
| 7,370,080 B2 * | 5/2008 | Yoshida | 709/206 |
| 7,474,428 B2 | 1/2009 | Morris-Jones et al. | 358/1.15 |
| 7,525,676 B2 | 4/2009 | Pesar | 358/1.13 |
| 7,733,548 B2 * | 6/2010 | Makino et al. | 358/520 |
| 7,778,556 B2 | 8/2010 | Ohkawa et al. | 399/27 |
| 8,654,372 B2 * | 2/2014 | Ukegawa | 358/1.15 |
| 2008/0109568 A1 | 5/2008 | Rengarajan et al. | 710/19 |
| 2008/0193157 A1 | 8/2008 | Shelton et al. | 399/82 |
| 2010/0245891 A1 * | 9/2010 | Miyake | 358/1.15 |

* cited by examiner

*Primary Examiner* — Thomas D Lee
(74) *Attorney, Agent, or Firm* — Luis M. Ortiz; Kermit D. Lopez; Ortiz & Lopez, PLLC

(57) ABSTRACT

A method and system for automatically holding and authenticating a configuration change payload job. An upgrade payload file can be transmitted to a rendering device as a rendering job via a print submission protocol. The upgrade payload file can be detected by a configuration change detection and hold module configured in association with the rendering device upon receiving the rendering job. The rendering job can be automatically held at the rendering device until an authenticated user releases the rendering job. The held rendering job can be also automatically deleted after a predetermined time period. The configuration change detection and hold module can be enabled and/or disabled by the authenticated user in order to prevent an unauthorized and accidental system upgrade and configuration change.

18 Claims, 5 Drawing Sheets

AUTOMATED METHOD AND SYSTEM FOR HOLDING AND AUTHENTICATING A DEVICE CONFIGURATION CHANGE PAYLOAD JOB

TECHNICAL FIELD

Embodiments are generally related to data-processing methods and systems, and downloadable modules and files. Embodiments are also related to multi-function devices such as, for example, printers, scanners, photocopy machines, and the like. Embodiments are additionally related to the detection and authentication of an upgrade process.

BACKGROUND OF THE INVENTION

Networked rendering devices can interact with an assemblage of other rendering devices, client devices, servers, and other components that are connected to and communicate over a network. One example of a rendering device is an MFD (Multi-Function Device), which includes the functionality of multiple rendering devices such as printers, scanners, faxes, copy machines, and so forth. Each MFD in a network, for example, can include a variety of print capabilities options such as, finishing, media quality, supply levels and size.

Manufacturers and operators of networked devices require a comprehensive solution for automatically upgrading the devices without the presence of a customer service representative. Such upgrades can provide the deployed devices with new features, reliability enhancements, performance improvements, configuration changes (clone files), updated applications, updated application data, security patches, and bug fixes. Conventionally, a payload that includes a new software and configuration change in many devices can be submitted remotely as a rendering job. Such upgrade payloads must be authenticated in order to protect the networked devices from an unauthorized configuration change.

Based on the foregoing, it is believed that a need exists for a method and system for automatically holding and authenticating a device configuration change payload job, as will be described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved upgrade techniques.

It is another aspect of the disclosed embodiments to provide for an improved networked rendering device such as, for example, a printer, scanner, photocopy machine, fax machine, and/or an MFD.

It is a further aspect of the disclosed embodiments to provide for an improved method and system for detecting an upgrade payload file.

It is yet another aspect of the disclosed embodiments to provide for an improved method and system for automatically holding and authenticating a configuration change payload rendering job.

The aforementioned aspects and other objectives and advantages can now be achieved as described herein. A method and system for automatically holding and authenticating a configuration change payload job is disclosed herein.

An upgrade payload file can be transmitted to a rendering device as a rendering job via a print submission protocol. The upgrade payload file can be detected by a configuration change detection and hold module configured in association with the rendering device upon receiving the rendering job. The rendering job can be automatically held at the rendering device until an authenticated user releases the rendering job. The held rendering job can be also automatically deleted after a predetermined time period. The configuration change detection and hold module can be enabled and/or disabled by the authenticated user in order to prevent an unauthorized and accidental system upgrade and configuration change.

The upgraded and clone files can be submitted utilizing a print submission protocol for example, a WUI (Web User Interface), a USB (Universal Serial Bus) flash drive connected to a USB port located on the front of the rendering device and/or as a print ready file to a rendering device port (e.g., Port 9100). The configuration change detection and hold module addresses security concerns independent of the print submission protocol. The held jobs can be displayed at a user interface in order to release the rendering job by the authenticated user. Such an approach secures the software upgrades and system configuration changes and can be achieved without the difficult and unreliable task of securing all points of a rendering job submission.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
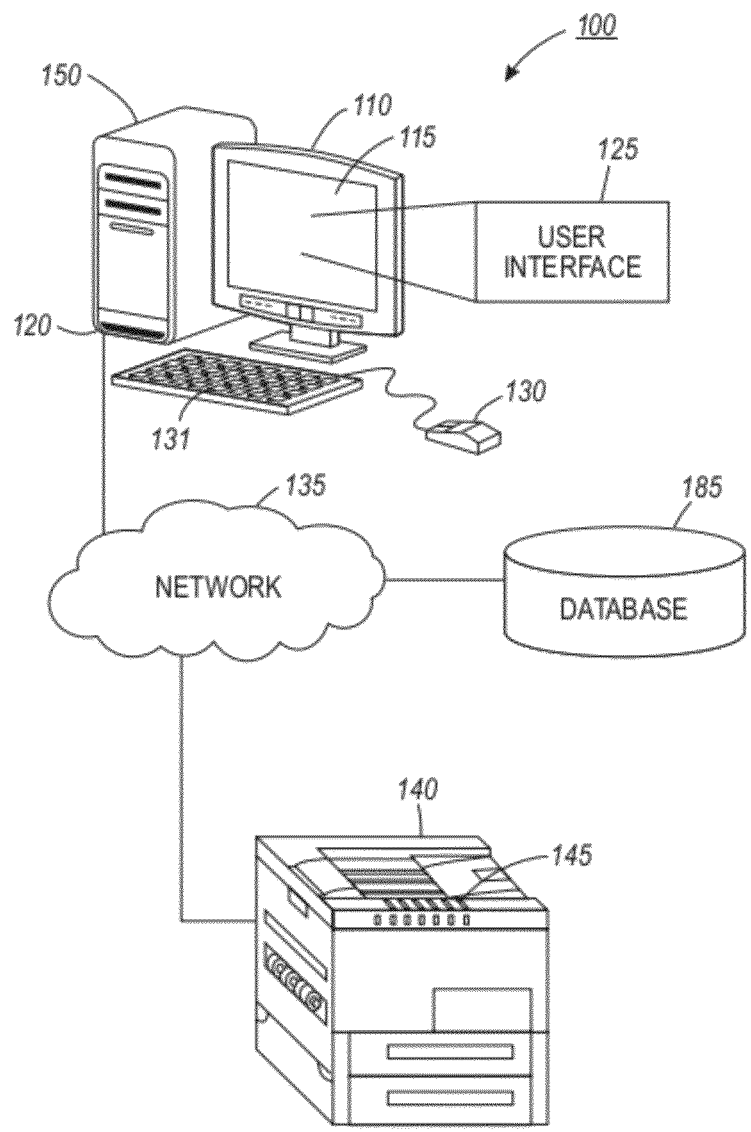
FIG. 1 illustrates an example of a rendering device coupled to a data-processing apparatus through a network, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, one or more of the disclosed embodiments can be embodied as a method, system, or computer program usable medium or computer program product. Accordingly, the disclosed embodiments can in some instances take the form of an entirely hardware embodiment, an entirely software embodiment or an embodiment combining software and hardware aspects all generally referred to herein as a "module". Furthermore, the disclosed embodiments may take the form of a computer usable medium or computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, etc.

Computer program code for carrying out operations of the present invention may be written in an object oriented programming language (e.g., Java, C++, etc.). The computer program code, however, for carrying out operations of the present invention may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, Wimax, 802.xx, and cellular network or the connection may be made to an external computer via most third party supported networks (for example, through the Internet using an Internet Service Provider).

The disclosed embodiments are described in part below with reference to flowchart illustrations and/or block diagrams of methods, systems, computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
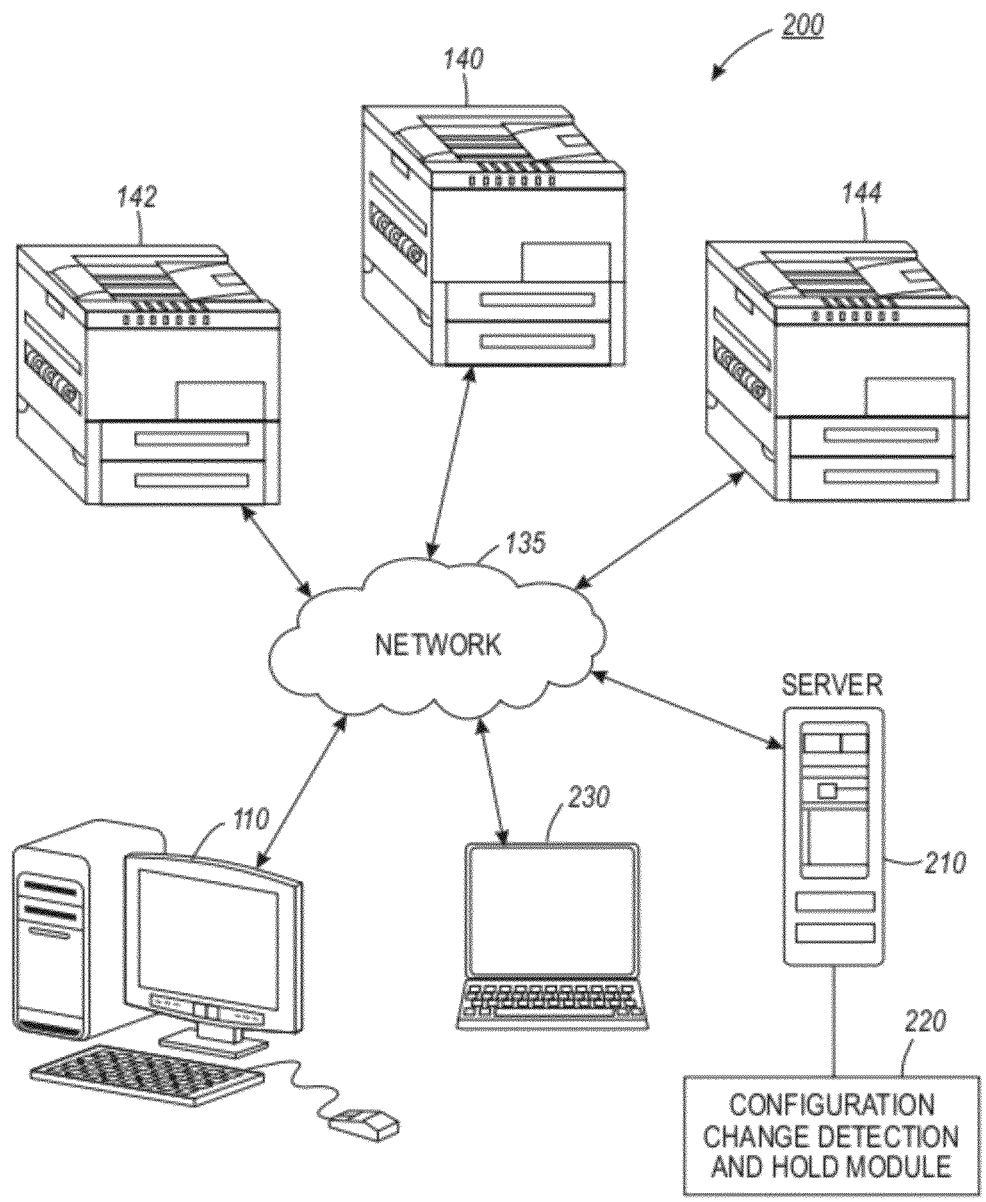
FIG. 2 illustrates a graphical representation of an upgrade payload authentication system, in accordance with the disclosed embodiments.

Referring to FIG. 1, system 100 can be configured to include one or more networked devices, such as networked device 140, which can communicate to a data-processing apparatus 110 through a network 135. In some embodiments, the networked device 140 may be a rendering device such as a printer, scanner, copy machine, MFD, a file server and/or a print server, and so forth. Thus, for example, although a single device 140 is shown in FIG. 2 in communication with network 135, it can be appreciated that a variety of different types of devices can communicate with network 135 as a part of system 100.

The data-processing apparatus 110 may be, for example, a personal computer or other computing device, and generally includes a central processor 120, a display device 115, a keyboard 131, and a pointing device 130 (e.g., mouse, track ball, pen device, or the like). Additional input/output devices, such as the rendering device 140 may be included in association with the data-processing apparatus 110 as desired. Note that as utilized herein, the term networked device may refer to an apparatus or system such as a printer, scanner, fax machine, copy machine, etc., and/or a combination thereof (e.g., an MFD). Preferably, networked device 140 is an MFD capable of multiple rendering functions such as printing, copying, scanning, faxing, etc. In some embodiments, the rendering device 140 may be implemented with a single rendering function such as printing. In other embodiments, the rendering device 140 can be configured to provide multiple rendering functions, such as scanning, faxing, printing and copying.

A non-limiting example of a rendering device that can be utilized as device 140 is disclosed in U.S. Pat. No. 7,525,676, entitled "System and Method for Controlling Access to Programming Options of a Multifunction Device," which issued on Apr. 28, 2009 to Robert J. Pesar. U.S. Pat. No. 7,525,676, which is incorporated herein by reference in its entirety, is assigned to the Xerox Corporation of Norwalk, Conn. Another non-limiting example of an device that can be utilized as device 140 is disclosed in U.S. Pat. No. 7,474,428, entitled "Multifunction Device System Using Tags Containing Output Information," which issued on Jan. 6, 2009 to Morris-Jones, et al. U.S. Pat. No. 7,474,428, which is incorporated herein by reference in its entirety, is also assigned to the Xerox Corporation of Norwalk, Conn. An additional example of a device that can be utilized as devices 140 is disclosed in U.S. Pat. No. 5,920,405, entitled "Multifunction Device With Printer Facsimile Contention Selection," which issued on Jul. 6, 1999 to McIntyre, et al. U.S. Pat. No. 5,920,405, which is incorporated herein by reference in its entirety, is also assigned to the Xerox Corporation of Norwalk, Conn.

The data-processing apparatus 110 can communicate with device 140 (and other devices) through the computer network 135. Network 135 may employ any network topology, transmission medium, or network protocol. The network 135 may include connections, such as wire, wireless communication links, or fiber optic cables. In the depicted example, network 135 is the Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages.

The networked device 140 can in some embodiments be configured to include a user interface 145, such as a panel menu. The panel menu may be used to select features and enter other data in the device 140. Such interfaces may include, for example, touch screens having touch activated keys for navigating through an option menu or the like. The data-processing apparatus 110 also includes a GUI 125 for communicating rendering features for processing, for example, the rendering job to a user and accepting the user's selection of available rendering features. The user interface 125 displays information and receives data through device display and/or the keyboard/mouse combination. The interface 125, also serves to display results, whereupon the user may supply additional inputs or terminate a given session. The data-processing apparatus 110 can be, for example, any computing device capable of being integrated within a network, such as a PDA, personal computer, cellular telephone, point-of-sale terminal, server, etc.

The input device of the networked device 140, for example, may be a local user interface 145, such as a touch-screen display or separate keypad and display or a memory fob or the like as discussed above. Alternatively or additionally, the input device may be a wireless port that receives a wireless signal containing constraint data from a portable device. The wireless signal may be an infrared or electromagnetic signal. A system administrator may input constraint data through the local user interface by manipulating the touch screen, keypad, or communicating via wireless messages through the wireless port. The administrator's portable device that communicates wirelessly may be a personal digital assistant (PDA), or the like, as noted above.

FIG. 2 illustrates a graphical representation of an upgrade payload authentication system 200 associated with a network 135, in accordance with the disclosed embodiments. Note that in the context of system 200, the person who releases the payload is also an important aspect of the disclosed embodiments, as this prevents anonymous configuration changes. This ensures, for example, that there can be an audit trail with the user name associated with the person who performed the release (e.g., this feature can be referred to in some embodiments as an "audit log") instead of not having a user name available in the audit log. Another important aspect of the disclosed embodiments is that the person releasing the payload is authorized to do so. Typically, authenticated users fall into groups that have rights to perform different operations. The "device administrator" is a predefined group authorized to perform the release of a held configuration change payload. Utilizing the approach of system 200 and the methods discussed herein, customers will be able to have the release operation available for additional groups and/or any authenticated user, or not have the configuration changing payloads be held at all.

The upgrade payload authentication system 200 generally includes a network infrastructure 135 associated with one or more networked devices 140, 142 and 144, data-processing system 110, a mobile communication device (e.g., a laptop) 230 and a document production visualization (DPV) server 210. Data-processing system 110 depicted in FIG. 2 can be, for example, a server. Other devices such as, for example, desktops, network devices, palmtops, mobile phones, etc may also be included in the network 135, as service providers. The devices 140, 142 and 144 can be located remotely with respect to each other, or alternatively, they may be located locally with respect to each other. Each of the devices 140, 142, and/or 144 can be, for example, a rendering device such as an MFD, printer, copies, scanner, etc.

The typical multifunction device may act as a combination of a printer, scanner, photocopier, fax and e-mail. While three multifunction devices 140, 142 and 144 are shown by way of example, it is to be appreciated that any number of rendering devices may be linked to the network, such as three, four, six or more rendering devices. In general, the multifunction devices 140, 142 and 144 can be employed to perform a rendering output function (e.g., printing, scanning, copying, faxing, etc.) within a networked environment. Note that multifunction devices 140, 142 and 144 are generally analogous to one another.

A configuration change detection and hold module 220 associated with the server 210 can be adapted for holding for authentication and authorization an upgrade payload file that changes the device configuration. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module), and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media, including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media, such as floppy disks, hard disk drives, CD ROMs, CD-Rs, etc., and transmission media, such as digital and/or analog communication links. Examples of transmission media can also include devices such as modems, which permit information to be transmitted over standard telephone lines and/or the more advanced digital communications lines.

Figure 3:
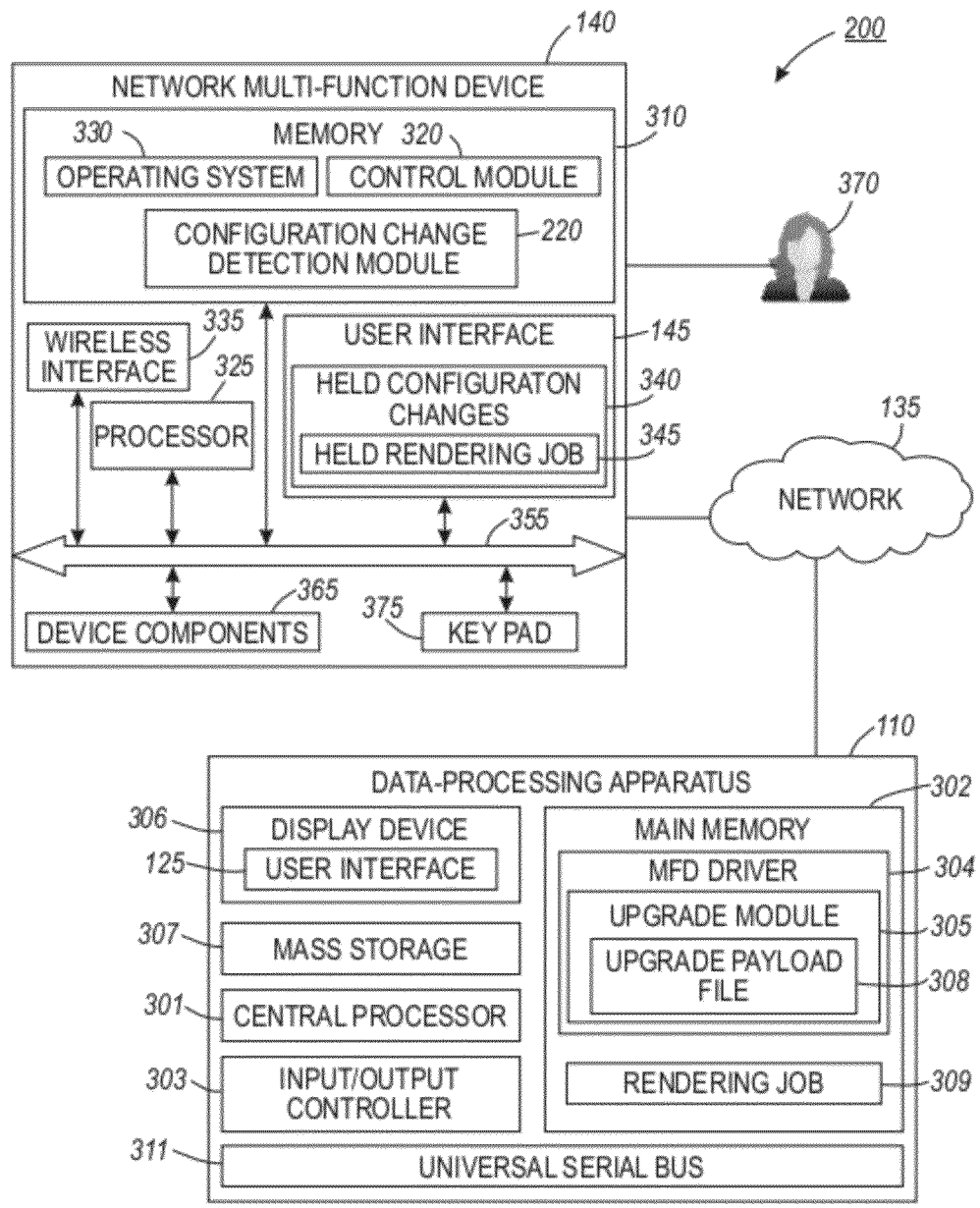
FIG. 3 illustrates a block diagram of the upgrade payload authentication system, in accordance with the disclosed embodiments.

FIG. 3 illustrates a block diagram of the upgrade payload authentication system 200, in accordance with the disclosed embodiments. The upgrade payload authentication system 200 generally includes the network multi-function device 140 and the data-processing apparatus 110 connected through the network 135. Note that the multifunction device 140 disclosed herein can be enabled to include the configuration change detection and hold module 220. The data-processing apparatus 110 includes, for example, a central processor 301, a main memory 302, an input/output controller 303, a display device 306, a mass storage 307 (e.g., a hard disk), and a USB (Universal Serial Bus) peripheral connection 311. The data-processing apparatus 110 receives user commands and data through user interface 125; these inputs may then be acted upon by the data-processing apparatus 110 in accordance with instructions from software application 220.

The interface 125, which is preferably a graphical user interface (GUI), also serves to display results, whereupon the user may supply additional inputs or terminate the session. The software application 220, on the other hand, can include instructions, such as the various operations described herein with respect to the various components and modules described herein, such as, for example, the method 400 depicted in FIG. 4. The multifunction device 140 further includes a processor circuit having a memory 310 and a processor 325 coupled to a local interface 355. The local interface 355 can be, for example, a data bus with an accompanying control/address bus. The memory 310 stores an operating system 330 and a control module 320 that are executable by the processor 325. The multifunction device 140 also includes various rendering device components 365 such as motors and mechanical paper path components as well as image creation components. A wireless network interface 335 coupled to the local interface 355 facilitates wireless communication with respect to the multifunction device 140.

A MFD driver program 304, for example, can be installed on the data-processing apparatus 110 and can reside on the main memory 302. The driver program 304 includes an upgrade module 305 that transmits an upgrade payload file 308 to the multifunction device 140 as a rendering job 309 via a print job submission protocol. The upgrade module 305 can be utilized in some embodiments with respect to a DLM (Dynamically Loadable Module) or other components or files, such as, for example, a postscript snippet (.ps file). Thus, in some instances, a configurationon changing payload may be a postscript snippet (.ps file) or other component, such as, for example, a DLM.

In some embodiments, dynamically loadable modules, which are kernel modules, can be dynamically linked into the kernel at runtime. Such dynamically loadable modules provide the system 200 with a great deal of flexibility because the kernel is able to load support for new hardware when the hardware is detected. Dynamically loadable modules can be utilized to add new features to the system 200 without requiring the system administrator to perform a manual reconfiguration. Note that an example of a DLM is a clone file. Clone files are DLM files that can be used to copy the configuration of one machine to another. The clone file is created at the source device using the WUI. The clone file can contain the configuration of just some feature(s). The clone file can be submitted as a rendering job to multiple target devices.

It can be appreciated, however, that the disclosed embodiments are not limited to DLM files. Reference to DLM files and "DLM" herein is provided only for illustrative purposes only. DLMs are not limited features of the disclosed embodiments. Instead, such embodiments are applicable for any configuration changing payload that can be submitted as a rendering job (e.g., a print job) as long as the receiving device detects that it will change the configuration. The device usually has to detect that at some point in order to implement the configuration change.

The print job submission protocol can be for example, a WUI (Web User Interface), a USB flash drive connected to a USB port located on the front of the multifunction device 140 and/or a print ready file transmitted to a multifunction device port (e.g., Port 9100), depending upon design considerations. It can be appreciated, however, that such embodiments can be implemented in the context of other protocols. The configuration change detection and hold module 220 address the security concerns independent of the print submission protocol. The configuration change detection and hold module 220 upon receiving the upgrade payload file 308 as a rendering job 345 by the multifunction device 140 can detect the upgrade payload file 308.

The configuration change detection and hold module 220 can be enabled to automatically hold the rendering job 345 at the multifunction device 140 until an authenticated user 370 releases the job 345. The rendering job 345 can be automatically deleted after a predetermined time period. The configuration change detection and hold module 220 can be enabled and/or disabled by the authenticated user 370 to prevent unauthorized and accidental system upgrade and system configuration change. The configuration change detection and hold module 220 can also be employed to automatically configure a graphical display (e.g., a GUI) to display the held rendering job, so that appropriate action may be taken by the authenticated user 370 to preclude the unauthorized and accidental system upgrades. The held rendering job 345 can be displayed in a "held configuration changes" tab 340.

Figure 4:
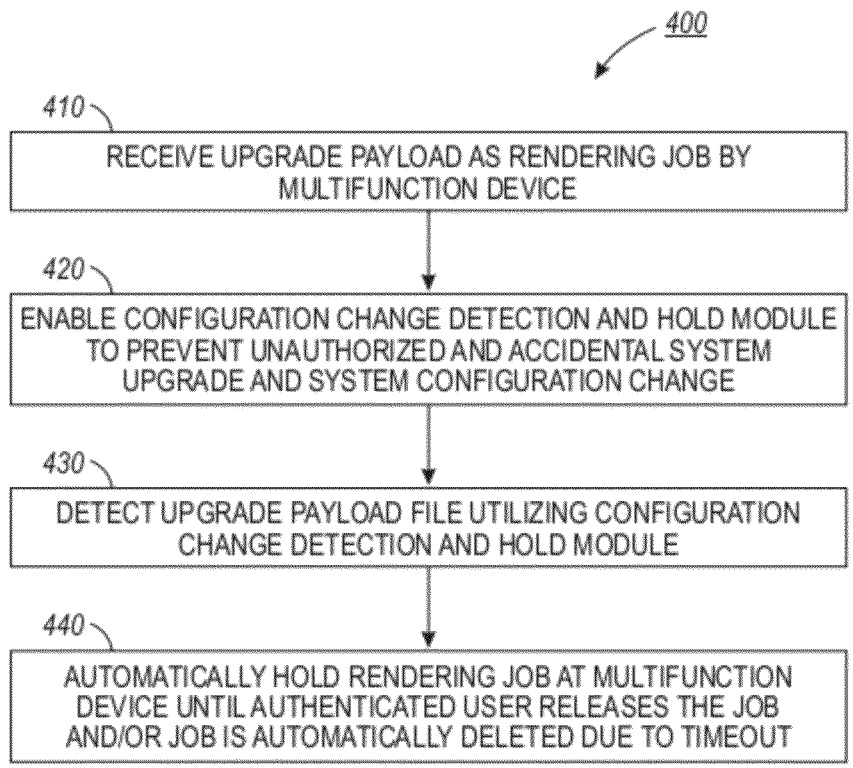
FIG. 4 illustrates a high level flow chart of operation illustrating logical operational steps of a method for holding and authenticating a configuration change payload rendering job, in accordance with the disclosed embodiments.

FIG. 4 illustrates a high level flow chart of operation illustrating logical operational steps of a method 400 for detecting and holding a configuration change payload rendering job, in accordance with the disclosed embodiments. It can be appreciated that the logical operational steps shown in FIG. 4 can be implemented or provided via, for example, a module such as module 220 shown in FIG. 2. As indicated at block 410, the upgrade payload file 308 can be received by the multifunction device 140 as rendering job. Thereafter, as illustrated at block 420, the configuration change detection and hold module 220 can be enabled to prevent unauthorized and accidental system upgrade and system configuration change. Next, as indicated at block 430, the upgrade payload file 308 can be detected by the configuration change detection and hold module 220. Thereafter, the rendering job can be automatically held at the multifunction device 140 until the authenticated user 370 releases the job 345 and/or the job 345 is automatically deleted due to timeout, as illustrated at block 440.

Figure 5:
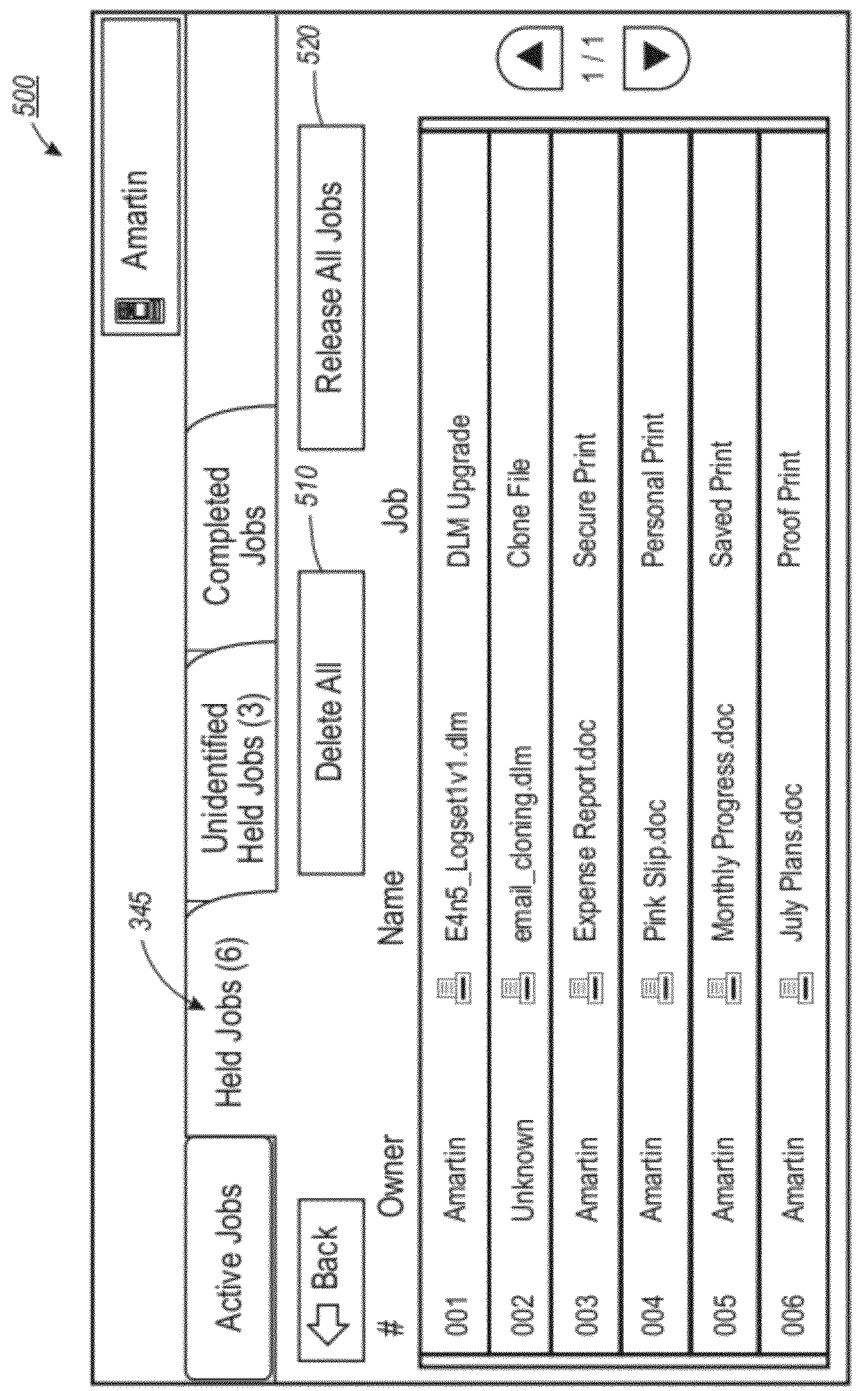
FIG. 5 illustrates a pictorial view of a GUI offering held job configuration changes, in accordance with the disclosed embodiments.

FIG. 5 illustrates a pictorial view of a GUI 500 offering held job configuration changes, in accordance with the disclosed embodiments. The GUI 500 can be implemented via a GUI such as, for example, the GUI 145 depicted in FIG. 3 herein, and may be provided by a module, such as, for example, module 220 (e.g., a software application) shown in FIG. 3. In the illustrated figures herein, the GUI 500 is generally implemented in the context of a GUI "window". Note that in computing, a GUI "window" is generally a visual area containing some type of user interface. Such a "window" usually (but not always) possesses a rectangular shape, and displays the output of and may allow input to one or more processes. Such windows are primarily associated with graphical displays, where they can be manipulated with a mouse cursor, such as, for example, the input device 130 depicted in FIG. 1.

The held jobs 345 can be displayed at the user interface 500 so that the authenticated user can release the rendering job by clicking the graphically displayed box 520. The held jobs 345 can be also deleted by clicking the graphically displayed box 510. A user can interact with the user interface 500 to select and operate such options by pointing and clicking with a user input device such as, for example, a touch screen. A particular item can function in the same manner to the user in all applications because the user interface provides standard software routines to handle these elements and reports the user's actions. Such an approach secures software upgrades and system configuration changes and can be achieved without the difficult and unreliable task of securing all points of rendering job submission.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for holding and releasing a change payload job, said method comprising:
   transmitting an upgrade payload file to a rendering device as a rendering job via a submission protocol and detecting said upgrade payload file;
   automatically holding said rendering job at said rendering device until an authenticated user releases said rendering job thus creating an audit trail with a user name associated with a person who performs said release and preventing an unauthorized and accidental system upgrade and configuration change, wherein said authenticated user is authorized to perform the release of a held configuration change payload; and
   automatically deleting said rendering job after a predetermined time period if a user is not authenticated to release said rendering job and attempts to release said rendering job fail, or said rendering job is not released within said predetermined time period.

2. The method of claim 1 further comprising upgrading said upgrade payload file utilizing a configuration change detection and hold module configured in association with said rendering device.

3. The method of claim 2 further comprising enabling said configuration change detection and hold module by said authenticated user.

4. The method of claim 2 further comprising disabling said configuration change detection and hold module by said authenticated user.

5. The method of claim 1 wherein said print submission protocol further comprises submitting said upgrade payload file utilizing a web user interface.

6. The method of claim 1 wherein said print submission protocol further comprises submitting said upgrade payload file via a universal serial bus flash drive connected to a universal serial bus port located on said device.

7. The method of claim 1 wherein said print submission protocol further comprises submitting said upgrade payload file as a print ready file to a rendering device port.

8. The method of claim 1 further comprising displaying said held rendering job at a user interface for said authenticated user to release said rendering job.

9. A system for holding and releasing a change payload job, said system comprising:
   a processor;
   a data bus coupled to said processor; and
   a computer-readable tangible storage device storing computer program code, said computer program code comprising program instructions executable by said processor, said program instructions comprising:
      program instructions to transmit an upgrade payload file to a rendering device as a rendering job via a submission protocol and detect said upgrade payload file;
      program instructions to automatically hold said rendering job at said rendering device until an authenticated user releases said rendering job thus creating an audit trail with a user name associated with a person who performs said release and preventing an unauthorized and accidental system upgrade and configuration change, wherein said authenticated user is authorized to perform the release of a held configuration change payload; and
      program instructions to automatically delete said rendering job after a predetermined time period if a user is not authenticated to release said rendering job and attempts to release said rendering job fail, or said rendering job is not released within said predetermined time period.

10. The system of claim 9 wherein said program instructions further comprise program instructions to upgrade said upgrade payload file utilizing a configuration change detection and hold module configured in association with said rendering device.

11. The system of claim 10 wherein said instructions are further configured for enabling said configuration change detection and hold module by said authenticated user.

12. The system of claim 10 wherein said program instructions further comprise program instructions to disable said configuration change detection and hold module by said authenticated user.

13. The system of claim 9 wherein said print submission protocol further comprises submitting said upgrade payload file utilizing a web user interface.

14. The system of claim 9 wherein said print submission protocol further comprises submitting said upgrade payload file via a universal serial bus flash drive connected to a universal serial bus port located on said device.

15. The system of claim 9 wherein said print submission protocol further comprises submitting said upgrade payload file as a print ready file to a rendering device port.

16. The system of claim 9 further comprising program instructions to display said held rendering job at a user interface for said authenticated user to release said rendering job.

17. A processor-readable non-transitory tangible storage device storing computer program code representing program instructions to perform a process to hold and release a change payload job, said program instructions comprising:
   program instructions to transmit an upgrade payload file to a rendering device as a rendering job via a submission protocol and detecting said upgrade payload file;
   program instructions to automatically hold said rendering job at said rendering device until an authenticated user releases said rendering job thus creating an audit trail with a user name associated with a person who performs said release and preventing an unauthorized and accidental system upgrade and configuration change, wherein said authenticated user is authorized to perform the release of a held configuration change payload; and
   program instructions to automatically delete said rendering job after a predetermined time period if a user is not authenticated to release said rendering job and attempts to release said rendering job fail, or said rendering job is not released within said predetermined time period.

18. The processor-readable non-transitory tangible storage device of claim 17 wherein said program instructions further comprise:

program instructions to automatically upgrade said upgrade payload file utilizing a configuration change detection and hold module configured in association with said rendering device;
program instructions to enable said configuration change detection and hold module by said authenticated user; and
program instructions to disable said configuration change detection and hold module by said authenticated user.

* * * * *